United States Patent
Yadav

(10) Patent No.: US 9,212,246 B1
(45) Date of Patent: Dec. 15, 2015

(54) METHODS OF PRODUCING CROSS-LINKED POLYMER ELECTROLYTE MEMBRANES HAVING FREE-RADICAL SCAVENGERS

(71) Applicant: Nissan North America, Inc., Franklin, TN (US)

(72) Inventor: Rameshwar Yadav, Farmington, MI (US)

(73) Assignee: NISSAN NORTH AMERICA, INC., Franklin, TN (US)

(*) Notice: Subject to any disclaimer, the term of this patent is extended or adjusted under 35 U.S.C. 154(b) by 0 days.

(21) Appl. No.: 14/446,403

(22) Filed: Jul. 30, 2014

(51) Int. Cl.
| | |
|---|---|
| C08F 2/46 | (2006.01) |
| C08G 61/04 | (2006.01) |
| C08F 228/02 | (2006.01) |
| H01M 8/10 | (2006.01) |

(52) U.S. Cl.
CPC ............ C08F 228/02 (2013.01); H01M 8/1027 (2013.01); H01M 8/1032 (2013.01); H01M 8/1072 (2013.01); H01M 2008/1095 (2013.01); H01M 2300/0082 (2013.01)

(58) Field of Classification Search
USPC .............................. 522/71, 189, 1, 184; 520/1
See application file for complete search history.

(56) References Cited

U.S. PATENT DOCUMENTS

| | | | |
|---|---|---|---|
| 6,117,961 A * | 9/2000 | Ogawa | ......................... 526/347 |
| 7,435,495 B2 | 10/2008 | DeSimone et al. | |
| 7,449,112 B2 | 11/2008 | Lee et al. | |
| 8,652,706 B2 | 2/2014 | Song | |
| 2001/0007890 A1 * | 7/2001 | NieSsner et al. | .............. 524/736 |
| 2006/0281824 A1 | 12/2006 | Asano et al. | |
| 2011/0046247 A1 | 2/2011 | Roelofs et al. | |

OTHER PUBLICATIONS

Kharas, Gregory et al, Novel Copolymers of 4-Fluorostyrene.7.Halogen Ring-Disubstituted 2-phenyl-1,1-dicyanoethylenes, 2011, Journal of Macromolecular Science, Part A: Pure and Applied Chemistry, 48, 95-99.*

Zhou, Zhilian, et al.; "Molded, High Surface Area Polymer Electrolyte Membranes from Cured Liquid Precursors", JACS Articles, J. Am. Chem. Soc. 2006, 128, pp. 12963-12972, Sep. 12, 2006.

Yildiz, Ufuk, et al.; "Free Radical Crosslinking Copolymerization. Gelation Behavior of Macromonomeric Azoinitiators Versus Macrocrosslinkers", Macromol. Chem. Phys. 199, pp. 163-168 (1998).

Yadav, Rameshwar, et al.; "Chemically Crosslinked Polymer Electrolyte Membranes from Fluorinated Liquid Precursors for Application in Fuel Cells", Dissertation submitted to the Graduate Faculty of North Carolina State University, Chemical Engineering, Raleigh, North Carolina, 2010, Chapters 4 and 5.

* cited by examiner

*Primary Examiner* — Ling Choi
*Assistant Examiner* — Jessica E Whiteley
(74) *Attorney, Agent, or Firm* — Young Basile Hanlon & MacFarlane, P.C.

(57) ABSTRACT

Methods of preparing a crosslinked polymer provide increased chemical durability resulting from the inclusion of antioxidants, or free-radical scavengers, to neutralize the radicals causing polymer membrane degradation. One method includes polymerizing, using an initiator with light irradiation or heat, a styrenated crosslinkable monomer with a styrene-based comonomer having the formula $CH_2=CH-C_6H_4-X$ and a free-radical scavenger. Examples of free-radical scavengers include 4-hydroxy styrene and 4-vinylaniline.

19 Claims, 1 Drawing Sheet

METHODS OF PRODUCING CROSS-LINKED POLYMER ELECTROLYTE MEMBRANES HAVING FREE-RADICAL SCAVENGERS

TECHNICAL FIELD

This disclosure relates to the manufacture of novel cross-linked styrene-based electrolyte membranes and cross-linked polymer electrolyte membranes having antioxidants.

BACKGROUND

PEM fuel cells (PEMFCs) generate power from electrochemical conversion of fuels such as hydrogen and hydrocarbons at its anode and oxidants such as oxygen and air at its cathode using a membrane as electrolyte. The membrane acts both as a proton conductor and a barrier between the fuel and oxidants. Developing a membrane with high ionic conductivity at high temperature and low relative humidity (RH %) is desired to simplify the humidification system and operation, improve fuel cell performance, and reduce the cost for early commercialization of fuel cell electric vehicles. Current state-of-the-art membranes such as Nafion™ membranes and other perfluorosulfonic acid (PFSA) membranes have reasonable conductivity at high RH % and at temperatures below 100° C. However, these membranes hold less water at low RH % and undergo permanent thermal degradation at temperatures above 100° C.

In these membranes, conductivity at low RH % could be improved by increasing the acid content (—$SO_3H$ group) or by reducing the equivalent weight (EW). However, increasing the acid content beyond certain values leads to polymer dissolution, weak mechanical structure, and eventually failure of the membrane in fuel cells. The linear-chain-structure in current state-of-the-art PFSA membranes is inadequate to allow acid content beyond certain values. Without increasing the acid content and preventing polymer structure damage at high temperature, current state-of-the-art PFSA membranes are unable to function at low RH % and at high temperature. In addition, these current PFSA membranes are manufactured under extremely high reaction conditions using sophisticated equipment and processes that make them difficult and expensive to produce.

SUMMARY

Disclosed herein are methods of preparing a crosslinked polymer having increased chemical durability resulting from the inclusion of antioxidants, or free-radical scavengers, to neutralize the radicals causing polymer membrane degradation. One method disclosed herein comprises polymerizing using an initiator with light irradiation or heat a styrenated crosslinkable monomer with a styrene-based comonomer having the formula $CH_2$=CH—$C_6H_4$—X and a free-radical scavenger. Examples of free-radical scavengers include 4-hydroxy styrene and 4-vinylaniline.

The styrenated crosslinkable monomer can have the following linear chain formula $CH_2$=CH—$C_6H_4$—$CH_2$—O—$(CX_2)_n$—O—$CH_2$—$C_6H_4$—CH=$CH_2$, wherein X=F or H and the crosslinked polymer can have the following structure:

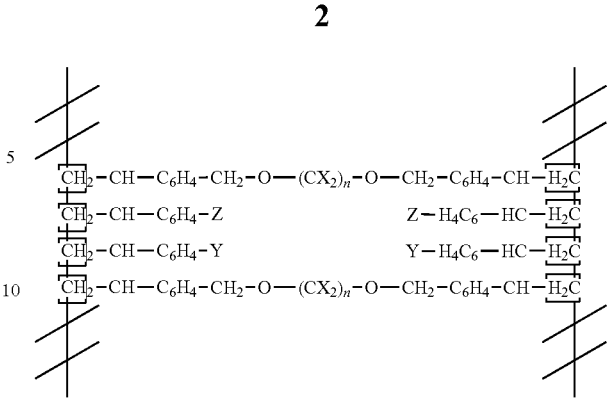

wherein X=F or H, Y=$SO_3H^+$ or $R_f$—$SO_3H^+$, with $R_f$=—$(CF_2)_m$—O—$CF_2CF_2$— and m=2-7, and Z=OH or $NH_2$ as the free-radical scavenger.

The styrenated crosslinkable monomer can have the following linear chain formula $CH_2$=CH—$C_6H_4$—$CH_2$—$(OCH_2CH_2)_n$—O—$CH_2$—$C_6H_4$—CH=$CH_2$, the styrenated crosslinkable monomer being a styrenated polyethylene glycol having a molecular weight between 200 and 35,000 g/mol or a styrenated polyethylene oxide having a molecular weight between 100,000 and 800,000 g/mol. The crosslinked polymer can have the following structure, wherein X=$SO_3H^+$ or $R_f$—$SO_3H^+$, with $R_f$=—$(CF_2)_m$—O—$CF_2CF_2$— and m=2-7, and Z=OH or $NH_2$:

Polymer electrolyte membranes produced from the crosslinked polymers are also disclosed.

These and other aspects of the present disclosure are disclosed in the following detailed description of the embodiments, the appended claims and the accompanying figures.

BRIEF DESCRIPTION OF THE DRAWINGS

The various features, advantages and other uses of the present apparatus will become more apparent by referring to the following detailed description and drawing in which.

DETAILED DESCRIPTION

The inventors' objective of developing PFSA membranes capable of functioning at low RH % and at high temperature is realized by their development of styrenated crosslinkable monomers and the crosslinked polymers produced from the inventive monomers. The bifunctional styrene-based liquid monomers disclosed herein have a very strong middle segment that can be readily produced without the need for extremely high reaction conditions and the sophisticated equipment and processes that renders production difficult and expensive. The styrenated crosslinkable monomers can easily be polymerized with many types of comonomer to develop varieties of membranes. The crosslinked polymers disclosed herein provide membranes with very low equivalent weight that can retain the morphological structure at high temperatures while maintaining conductivity at low RH %.

The inventors have discovered that when crosslinkers, such as some commercially available crosslinkers, with fragile or weak middle segments are used to develop membranes, these membranes are not mechanically strong. In addition, these crosslinkers do not allow for the increase in acid content in the membrane. In some instances, acid bearing side groups of membranes are also ionically crosslinked. But this type of crosslinking is not stable and unravels under liquid water and high temperature.

The styrenated crosslinkable monomers disclosed herein have a strong middle segment to prevent dissolution of the membrane, resulting in a crosslinked polymer having a fluorinated segment between benzene and —$SO_3H$ that is highly acidic. No weak middle segments are incorporated between the two end reactive groups to fabricate the membrane.

To further improve the chemical durability of the membranes produced with the crosslinked polymers disclosed herein, the inventors further developed the crosslinked polymers to include antioxidants, or free-radical scavengers, directly in the polymer structure that neutralize the radicals responsible for chemical degradation of the membranes. Free-radical scavengers such as 4-hydroxy styrene or 4-vinylaniline are co-added with the styrene-based comonomer prior to polymerization to neutralize free-radicals OH., OOH. responsible for the chemical degradation. Although cerium oxide or other inorganic additives have been added in polymer electrolyte membranes to improve chemical durability, these additives can leach out from the membrane, compromising the durability. It is believed that the polymer based additives (4-hydroxy styrene or 4-vinyl aniline) used as free-radicals scavengers to improve the durability are more stable than the inorganic fillers in the membrane.

The membranes produced as disclosed herein with the styrenated crosslinkable monomers and a compatible comonomer incorporate acid functionality to the membrane and greater chemical durability. The disclosed styrenated crosslinkable monomers can be used to develop other types of polymer materials as well.

Figure 1:
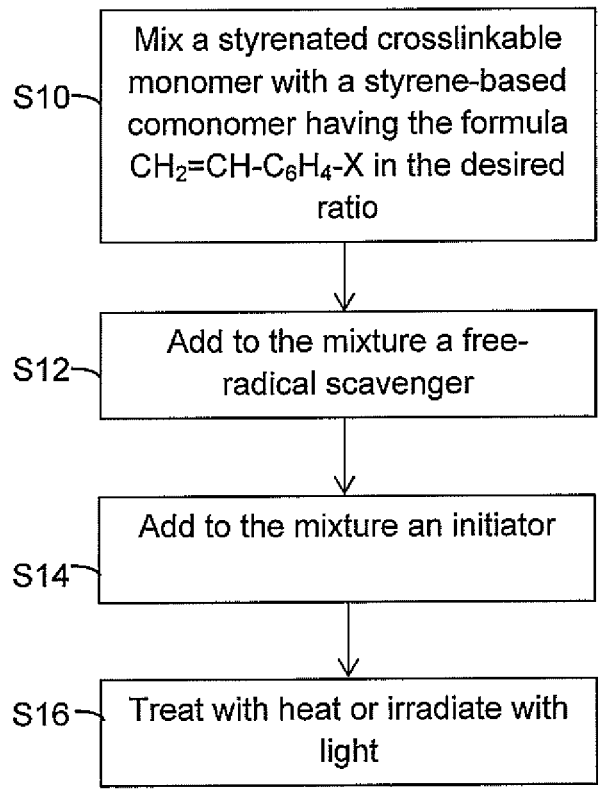
FIG. 1 is a flow diagram of a method of making a crosslinked polymer having free-radical scavengers as disclosed herein.

FIG. 1 is a flow diagram of a method of producing a crosslinked polymer as disclosed herein. The crosslinked polymers and membranes produced there from have increased chemical durability resulting from the inclusion of antioxidants, or free-radical scavengers, to neutralize the radicals that cause polymer membrane degradation. As shown in FIG. 1, the crosslinked polymers are polymerized using an initiator with light irradiating or heating a styrenated crosslinkable monomer with a styrene-based comonomer having the formula $CH_2$=CH—$C_6H_4$—X and a free-radical scavenger. Examples of free-radical scavengers include 4-hydroxy styrene and 4-vinylaniline.

In step 10, the styrenated crosslinkable monomer is mixed with the styrene-based comonomer having the formula $CH_2$=CH—$C_6H_4$—X. In step 12, the free-radical scavenger is added to the mixture at about 1-2 weight %. Alternatively, the components can be mixed together in one step. An initiator is added, such as azobisisobutyronitrile (AIBN) or benzoyl peroxide, to initiate the polymerization reaction in step 14. In step 16, the mixture is treated with heat or irradiated with light, such as UV light. Additional polymerization steps are required depending on the styrene-based comonomer used. Additional steps can include ion exchange, hydrolyzation and other reactions, described in more detail with reference to the Examples.

The styrenated crosslinkable monomer can have the following linear chain formula $CH_2$=CH—$C_6H_4$—$CH_2$—O—$(CX_2)_n$—O—$CH_2$—$C_6H_4$—CH=$CH_2$, wherein X=F or H and the crosslinked polymer can have the following structure:

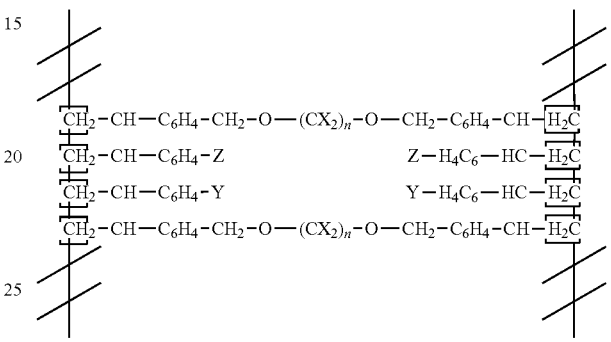

wherein X=F or H, Y=$SO_3H^+$ or $R_f$—$SO_3H^+$, with $R_f$=—$(CF_2)_m$—O—$CF_2CF_2$— and m=2-7, and Z=OH or $NH_2$ as the free-radical scavenger.

One of the styrenated crosslinkable monomers disclosed herein is styrenated perfluoro alkane (SPA) having the following formula:

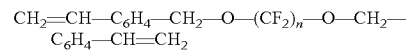

SPA is produced using a diol with a linear chain fluorinated segment having the following formula, where n=6-14:

One example of such a diol is 1H,1H,12H,12H-perfluoro-1,12-dodecanediol. The SPA is produced by functionalizing the diol with the linear chain fluorinated segment with styrene. Functionalizing can be done by mixing the diol with vinyl benzyl chloride, for example. The diol and vinyl benzyl chloride can be mixed in a solvent and reacted using a base such as potassium hydroxide to functionalize the diol with styrene at both ends, with the reaction carried out at room temperature until completion. The product is quenched with an acid and filtered. The filtered product is dried and the SPA is precipitated using diethyl ether. The SPA is highly reactive, warranting storage at very low temperature.

Another of the styrenated crosslinkable monomers disclosed herein is styrenated hydrocarbon alkane (SHA) having the following formula:

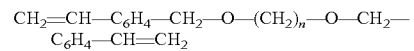

SHA is produced using a linear chain hydrocarbon diol having the following formula, where n=6-18:

One example of such a diol is 1,12-dodecanediol. The SHA is produced by functionalizing the hydrocarbon diol with styrene. Functionalizing can be done by mixing the hydrocarbon diol with vinyl benzyl chloride, for example. The diol and vinyl benzyl chloride can be mixed in a solvent and reacted using a base to functionalize the diol with styrene at both ends, with the reaction carried out at room temperature until completion. The product is quenched with an acid and filtered. The filtered product is dried and the SHA is precipitated using diethyl ether. The SHA is highly reactive, warranting storage at very low temperature.

Crosslinked polymers can be produced from the styrenated crosslinkable monomers SPA and SHA, thereby producing membranes with very low equivalent weight that can retain the morphological structure at high temperatures while maintaining conductivity at low RH %. The addition of the free-radical scavenger provides greater chemical durability to membranes produced with the crosslinked polymers over and above conventional polymer membranes.

The styrenated crosslinkable monomer can also have the following straight chain formula:

$$CH_2=CH-C_6H_4-CH_2-(OCH_2CH_2)_n-O-CH_2-C_6H_4-CH=CH_2$$

with the middle segment having either a molecular weight between 200 g/mol and 35,000 g/mol or between 100,000 g/mol and 800,000 g/mol. Depending on the molecular weight, the styrenated crosslinkable monomer is referred to as a styrenated polyethylene glycol (sPEG) or a styrenated polyethylene oxide (sPEO).

The styrenated crosslinkable monomer can be produced from a two arm polyethylene glycol (PEG) of the formula H—(OCH$_2$CH$_2$)n-OH having a molecular weight between 200 g/mol and 35,000 g/mol.

The styrenated crosslinkable monomer can also be produced from a two arm polyethylene oxide (PEO) of the formula H—(OCH$_2$CH$_2$)n-OH having a molecular weight between 100,000 g/mol and 800,000 g/mol.

The styrenated crosslinkable monomer can also be produced from a four arm PEG of the following formula:

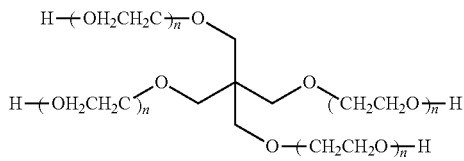

The styrenated crosslinkable monomer is produced by functionalizing each arm of the PEG or PEO with styrene. Functionalizing can be done by mixing the PEG or PEO with vinyl benzyl chloride (CH$_2$=CH—C$_6$H$_4$—CH$_2$—Cl), for example. The PEG or PEO and vinyl benzyl chloride can be mixed in a solvent and reacted using a base such as potassium hydroxide to functionalize the arms with styrene at each end, with the reaction carried out at room temperature until completion. The product is quenched with an acid and filtered. The filtered product is dried and the styrenated crosslinkable monomer is precipitated using diethyl ether. The styrenated crosslinkable monomer is highly reactive, warranting storage at very low temperature.

Crosslinked polymers can be produced from the styrenated crosslinkable monomer of formula CH$_2$=CH—C$_6$H$_4$—CH$_2$—(OCH$_2$CH$_2$)$_n$—O—CH$_2$—C$_6$H$_4$—CH=CH$_2$, thereby producing membranes with very high acid content that can retain the morphological structure at high temperatures while maintaining conductivity at low RH %. The addition of the free-radical scavenger provides greater chemical durability to membranes produced with the crosslinked polymers over and above conventional polymer membranes. The crosslinked polymer will have the following structure, with n being dependent on the molecular weight of the styrenated crosslinkable monomer used, wherein X=SO$_3$H$^+$ or R$_f$—SO$_3$H$^+$, with R$_f$=—(CF$_2$)$_m$—O—CF$_2$CF$_2$— and m=2-7, and Z=OH or NH$_2$:

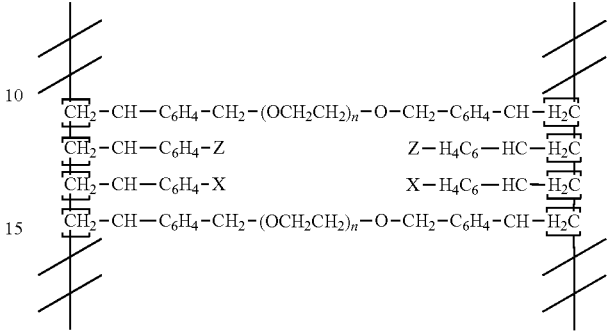

Any of the crosslinked polymers disclosed herein can be fluorinated by adding an additional step to the methods. To develop a pure fluorinated membrane, a crosslinked polymer can be fluorinated with elemental fluorine gas to convert hydrogen elements into fluorine, resulting in the fluorinated crosslinked polymer.

The crosslinked polymers disclosed herein can be used to produce a polymer electrolyte membrane for use in a fuel cell, for example. To fabricate a composite membrane, the crosslinked polymer is imbibed into a porous support, including ePTFE, a nanofiber support or any other support, polymerized, hydrolyzed, and ion-exchanged.

The styrenated crosslinkable monomers disclosed herein can also be used to produce crosslinked membranes for alkaline fuel cells and direct methanol fuel cells. For alkaline fuel cells, a comonomer such as vinyl benzyl trimethyl chloride/hydroxide can be polymerized with the styrenated crosslinkable monomers to produce an ion exchange membrane with very low equivalent weight, high conductivity, and a strong structure. These styrenated crosslinkable monomers can also be used with other types of comonomers to develop an ion exchange membrane. For direct methanol fuel cells, crosslinked membranes can be developed with low equivalent weight and strong structure because direct methanol fuel cells also use proton exchange membranes similar to hydrogen fuel cells. Since the styrenated crosslinkable monomers are styrene-based bifunctional monomers and styrene has very high reactivity and is easily polymerizable, they can also be copolymerized with many types of compatible non-styrene based comonomers to develop crosslinked polymers.

Figure 2:
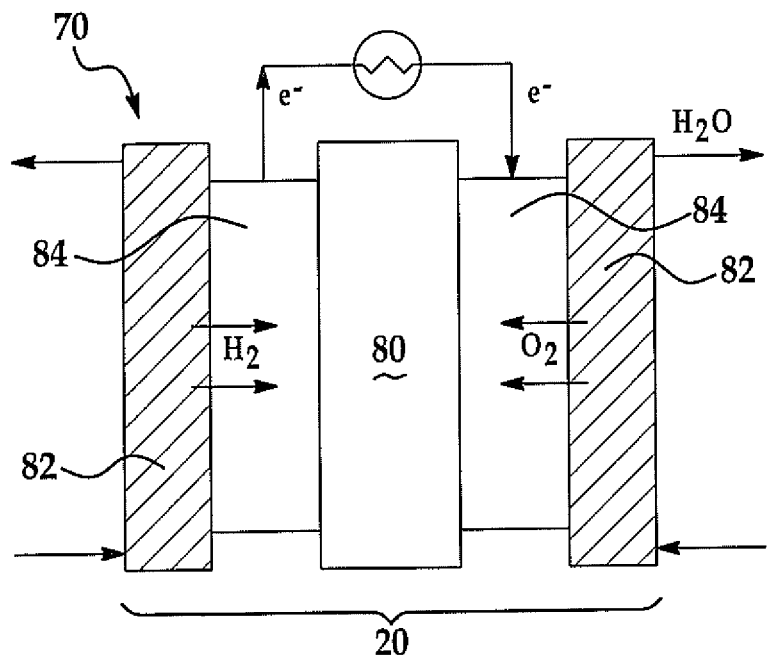
FIG. 2 is a schematic of a membrane electrode assembly of a fuel cell incorporating a crosslinked polymer as disclosed herein.

FIG. 2 illustrates the use of a membrane produced with a crosslinked polymer disclosed herein. FIG. 2 is a schematic of a fuel cell 70, a plurality of which makes a fuel cell stack. The fuel cell 70 is comprised of a single membrane electrode assembly 20. The membrane electrode assembly 20 has a membrane 80 made from a crosslinked polymer disclosed herein, the membrane 80 coated with catalyst 84 with a gas diffusion layer 82 on opposing sides of the membrane 80. The membrane 80 has a catalyst layer 84 formed on opposing surfaces of the membrane 80, such that when assembled, the catalyst layers are each between the membrane 80 and a gas diffusion layer 82. Alternatively, a gas diffusion electrode is made by forming one catalyst layer 84 on a surface of two gas diffusion layers 82 and sandwiching the membrane 80 between the gas diffusion layers 82 such that the catalyst layers 84 contact the membrane 80. When fuel, such as hydrogen gas (shown as H$_2$), is introduced into the fuel cell 70, the catalyst layer 84 of the catalyst coated membrane 80 splits hydrogen gas molecules into protons and electrons. The protons pass through the membrane 80 to react with the oxidant (shown as $O_2$), such as oxygen or air, forming water ($H_2O$). The electrons ($e^-$), which cannot pass through the membrane 80, must travel around it, thus creating the source of electrical energy.

Examples of crosslinked polymers produced by one of the styrenated crosslinkable monomers disclosed herein and for use in polymer electrolyte membranes are described in greater detail. Any of the examples herein can further be fluorinated with elemental fluorine gas to convert hydrogen elements in to fluorine.

A crosslinked polymer is produced by mixing the desired ratio of SPA with styrene sulfonic acid comonomer having the formula $CH_2=CH-C_6H_4-SO_3H^+$, along a free-radical scavenger at about 1-2 wt. %. A free-radical initiator such as azobisisobutyronitrile (AIBN) or benzoyl peroxide is added to initiate the polymerization reaction, the mixture polymerized under heat or UV light. The resulting crosslinked polymer has the following Structure 1, with Z=OH if the free-radical scavenger is of the formula $CH_2=CH-C_6H_4-OH$ and $Z=NH_2$ if the free-radical scavenger is of the formula $CH_2=CH-C_6H_4-NH_2$:

Structure 1

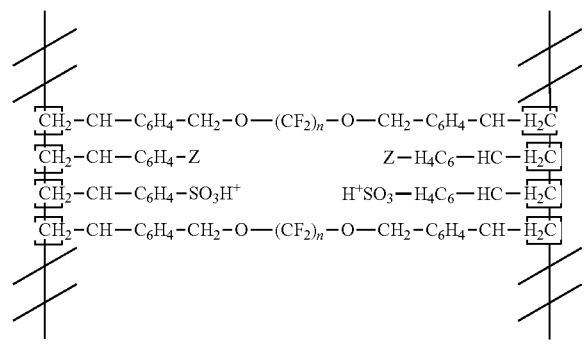

The crosslinked polymer shown in Structure 1 is also produced by mixing the desired ratio of SPA with styrene sulfonate-sodium comonomer having the formula $CH_2=CH-C_6H_4-SO_3Na^+$, along with a free-radical scavenger at about 1-2 wt. % and the initiator, with the mixture polymerized under heat or UV light. The intermediate polymer structure shown below

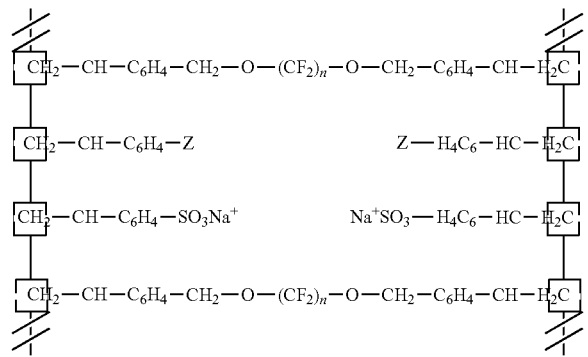

further undergoes ion exchange with an acid solution to produce the crosslinked polymer shown in Structure 1.

Another crosslinked polymer is produced by mixing the desired ratio of SPA with styrene sulfonyl halide comonomer having the formula $CH_2=CH-C_6H_4-SO_2Cl$ or $CH_2=CH-C_6H_4-SO_2F$, along with a free-radical scavenger at about 1-2 wt. % and the initiator, the mixture polymerized under heat or UV light. The intermediate polymer structure shown below:

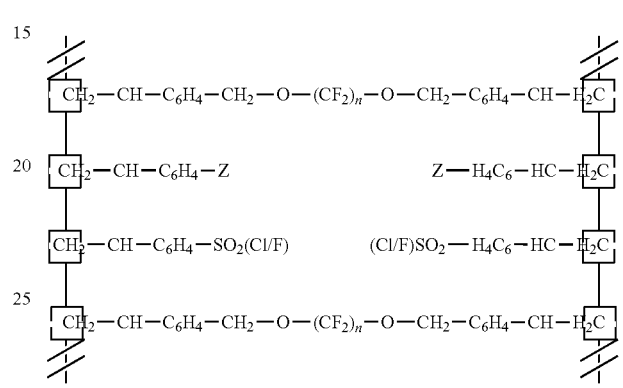

is hydrolyzed with a base/alcohol solution and undergoes ion exchange with an acid solution to produce the crosslinked polymer shown in Structure 1.

Another crosslinked polymer is produced by mixing the desired ratio of SPA with 4-Bromo styrene comonomer having the formula $CH_2=CH-C_6H_4-Br$, along with a free-radical scavenger at about 1-2 wt. % and the initiator, the mixture polymerized under heat or UV light. The intermediate polymer structure shown below

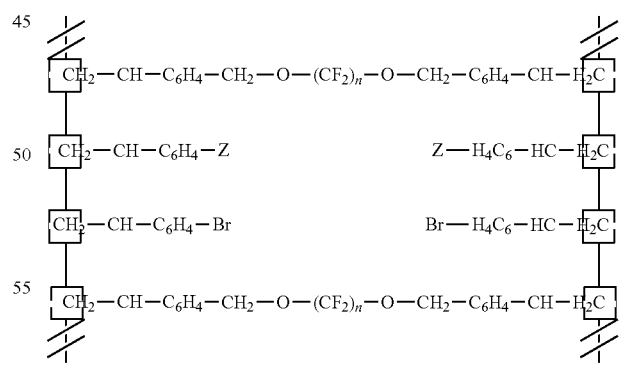

is reacted with $I-(CF_2)_m-O-CF_2-CF_2-SO_2F$, where m=2-7, under heat and in the presence of copper or copper oxide catalyst to produce a second intermediate polymer structure shown below:

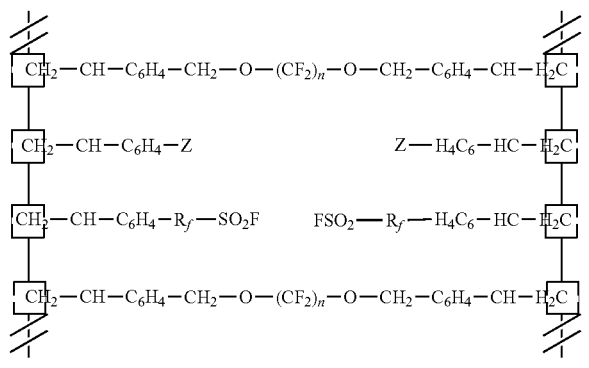

The second intermediate polymer structure is hydrolyzed with a base/alcohol solution and undergoes ion exchange with an acid solution to produce the crosslinked polymer shown in Structure 2 below, where $R_f$=—$(CF_2)_m$—O—$CF_2CF_2$— and m=2-7.

Structure 2

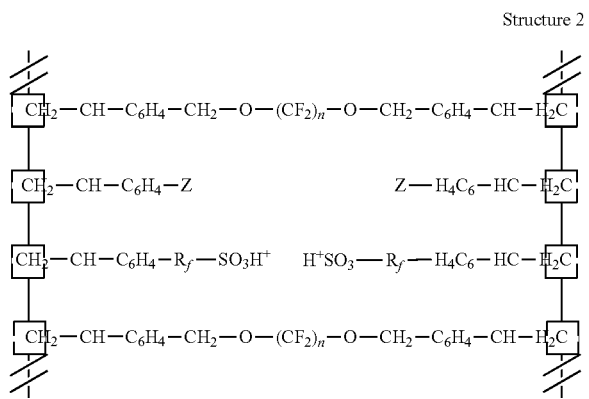

Another crosslinked polymer is produced by mixing the desired ratio of SPA with 4-hydroxy styrene comonomer having the formula $CH_2$=CH—$C_6H_4$—OH, along with a free-radical scavenger at about 1-2 wt. % and the initiator, the mixture polymerized under heat or UV light. The intermediate polymer structure shown below

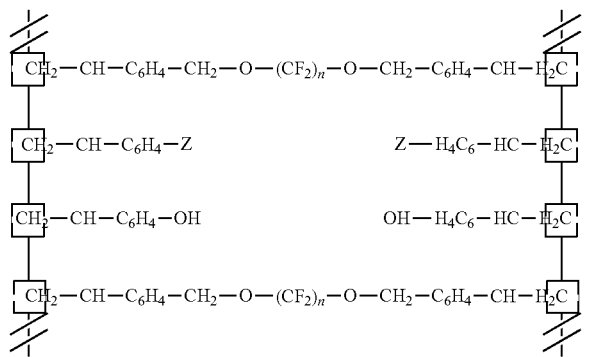

is reacted with I—$(CF_2)_m$—O—$CF_2$—$CF_2$—$SO_2F$, where m=2-7, under heat and in the presence of copper or copper oxide catalyst to produce a second intermediate polymer structure shown below.

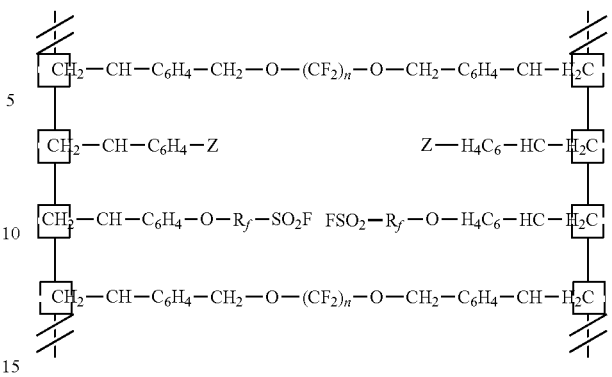

The second intermediate polymer structure is hydrolyzed with a base/alcohol solution and undergoes ion exchange with an acid solution to produce the crosslinked polymer shown in Structure 2, where, again, $R_f$=—$(CF_2)_m$—O—$CF_2CF_2$— and m=2-7.

Similar crosslinked polymer structures are produced using SHA rather than SPA, with the middle segment being —$(CH_2)_n$— rather than —$(CF_2)_n$— as shown above.

Crosslinked polymers are also produced from sPEG and sPEO. The production of these crosslinked polymers will be described below. The structures are similar whether sPEG or sPEO is used as the styrenated crosslinkable monomer, with the difference being the molecular weight of the polymer.

A crosslinked polymer is produced by mixing the desired ratio of styrenated crosslinkable monomer sPEG/sPEO with the formula $CH_2$=CH—$C_6H_4$—$CH_2$—$(OCH_2CH_2)_n$—O—$CH_2$—$C_6H_4$—CH=$CH_2$ with styrene sulfonic acid comonomer having the formula $CH_2$=CH—$C_6H_4$—$SO_3H^+$, along a free-radical scavenger at about 1-2 wt. %. A free-radical initiator such as azobisisobutyronitrile (AIBN) or benzoyl peroxide is added to initiate the polymerization reaction, the mixture polymerized under heat or UV light. The resulting crosslinked polymer has the following Structure 3, with Z=OH if the free-radical scavenger is of the formula $CH_2$=CH—$C_6H_4$—OH and Z=$NH_2$ if the free-radical scavenger is of the formula $CH_2$=CH—$C_6H_4$—$NH_2$.

Structure 3

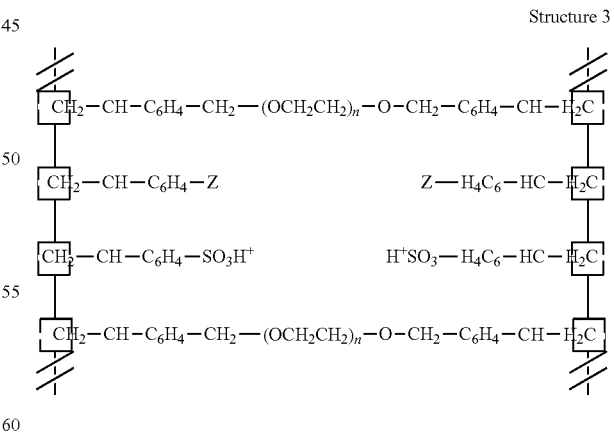

The crosslinked polymer shown in Structure 3 is also produced by mixing the desired ratio of sPEG/sPEO with styrene sulfonate-sodium comonomer having the formula $CH_2$=CH—$C_6H_4$—$SO_3Na^+$, along with a free-radical scavenger at about 1-2 wt. % and the initiator, with the mixture polymerized under heat or UV light. The intermediate polymer structure shown below

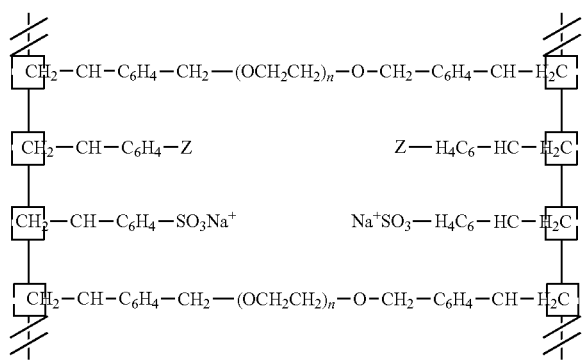

further undergoes ion exchange with an acid solution to produce the crosslinked polymer shown in Structure 3.

Another crosslinked polymer is produced by mixing the desired ratio of sPEG/sPEO with styrene sulfonyl halide comonomer having the formula $CH_2=CH-C_6H_4-SO_2Cl$ or $CH_2=CH-C_6H_4-SO_2F$, along with a free-radical scavenger at about 1-2 wt. % and the initiator, the mixture polymerized under heat or UV light. The intermediate polymer structure shown below:

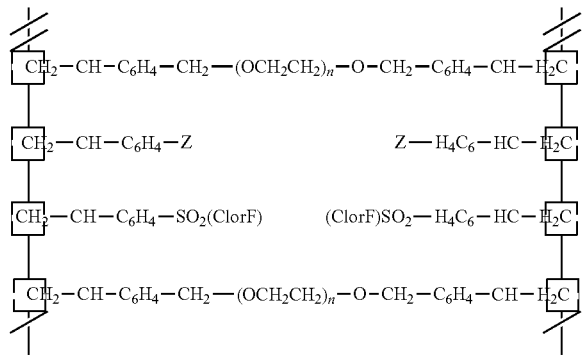

is hydrolyzed with a base/alcohol solution and undergoes ion exchange with an acid solution to produce the crosslinked polymer shown in Structure 3.

Another crosslinked polymer is produced by mixing the desired ratio of sPEG/sPEO with 4-Bromo styrene comonomer having the formula $CH_2=CH-C_6H_4-Br$, along with a free-radical scavenger at about 1-2 wt. % and the initiator, the mixture polymerized under heat or UV light. The intermediate polymer structure shown below

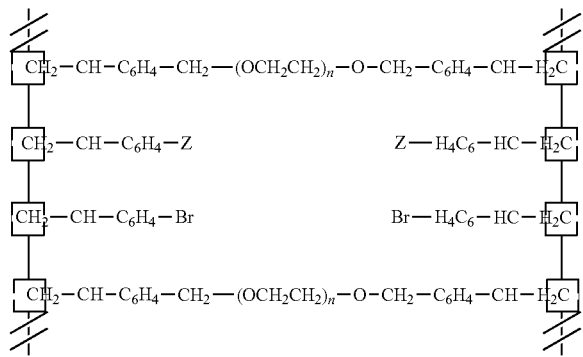

is reacted with $I-(CF_2)_m-O-CF_2-CF_2-SO_2F$, where m=2-7, under heat and in the presence of copper or copper oxide catalyst to produce a second intermediate polymer structure shown below:

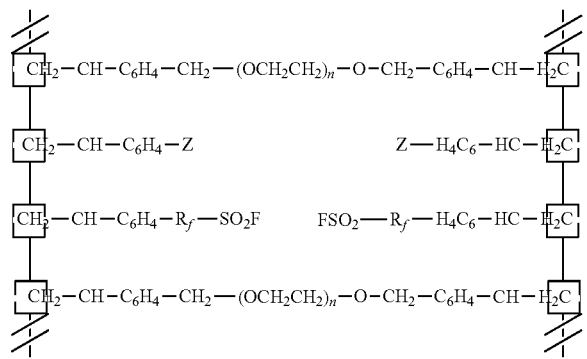

The second intermediate polymer structure is hydrolyzed with a base/alcohol solution and undergoes ion exchange with an acid solution to produce the crosslinked polymer shown in Structure 4 below, where $R_f=-(CF_2)_m-O-CF_2CF_2-$ and m=2-7.

Structure 4

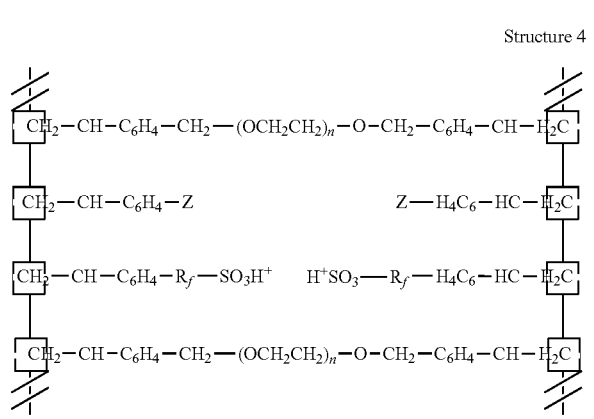

Another crosslinked polymer is produced by mixing the desired ratio of sPEG/sPEO with 4-hydroxy styrene comonomer having the formula $CH_2=CH-C_6H_4-OH$, along with a free-radical scavenger at about 1-2 wt. % and the initiator, the mixture polymerized under heat or UV light. The intermediate polymer structure shown below is reacted with I—$(CF_2)_m$—O—$CF_2$—$CF_2$—$SO_2F$, where m=2-7, under heat and in the presence of copper or copper oxide catalyst to produce a second intermediate polymer structure shown below.

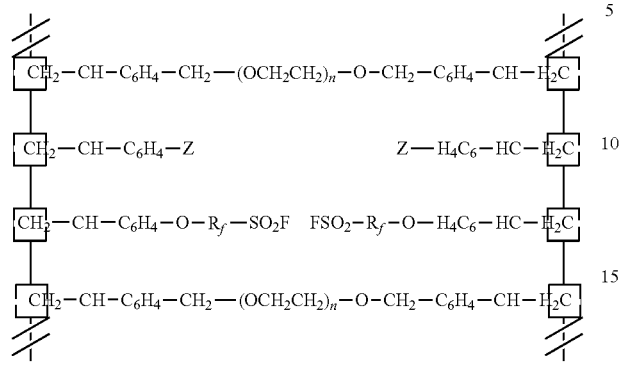

The second intermediate polymer structure is hydrolyzed with a base/alcohol solution and undergoes ion exchange with an acid solution to produce the crosslinked polymer shown in Structure 4, where, again, $R_f$=—$(CF_2)_m$—O—$CF_2CF_2$— and m=2-7.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A method of preparing a crosslinked polymer having increased chemical durability, the method comprising:
   polymerizing, using an initiator with light irradiation or heat treatment, a styrenated crosslinkable monomer having the following linear chain formula $CH_2$=CH—$C_6H_4$—$CH_2$—O—$(CX_2)_n$—O—$CH_2$—$C_6H_4$—CH=$CH_2$, wherein X=F and n=6-14 or X=H and n=6-18, with a styrene-based comonomer having the formula $CH_2$=CH—$C_6H_4$—Y, wherein Y=$SO_3H^+$ or $R_f$—$SO_3H^+$, with $R_f$=—$(CF_2)_m$—O—$CF_2CF_2$— and m=2-7, and a free-radical scavenger $CH_2$=CH—$C_6H_4$—Z, wherein Z=OH or $NH_2$, and the crosslinked polymer has the following Structure A:

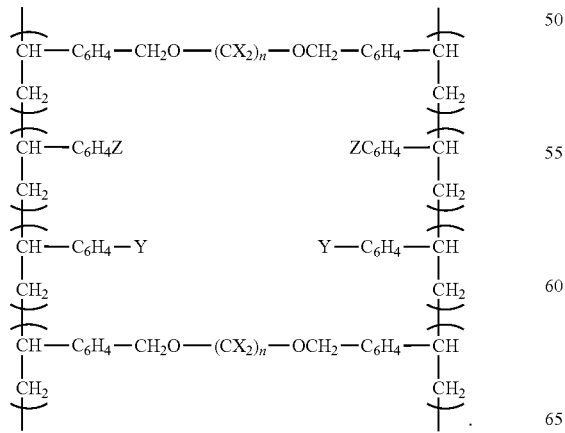

2. The method of claim 1, wherein the free-radical scavenger is 4-hydroxy styrene added at 1-2 wt. %.
3. The method of claim 1, wherein the free-radical scavenger is 4-vinylaniline added at 1-2 wt. %.
4. A method of preparing a crosslinked polymer comprising:
   polymerizing using an initiator with light irradiation or heat a straight chain styrenated crosslinkable monomer with a styrene-based comonomer having the formula $CH_2$=CH—$C_6H_4$—Y and 1-2 wt % of a free-radical scavenger selected from one of 4-hydroxy styrene and 4-vinylaniline, the free-radical scavenger configured to neutralize radicals OH. and OOH., wherein the styrenated crosslinkable monomer has the following linear chain formula $CH_2$=CH—$C_6H_4$—$CH_2$—O—$(CX_2)_n$—O—$CH_2$—$C_6H_4$—CH=$CH_2$, wherein X=F and n=6-14 or X=H and n=6-18 and the crosslinked polymer has the following Structure A:

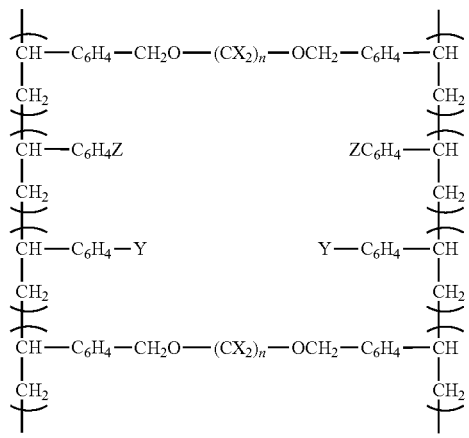

wherein Y=$SO_3H^+$ or $R_f$—$SO_3H^+$, with $R_f$=—$(CF_2)_m$—O—$CF_2CF_2$ and m=2-7.

5. The method of claim 1 further comprising:
   fluorinating the crosslinked polymer with elemental fluorine gas to convert hydrogen into fluorine, the crosslinked polymer produced having the following formula:

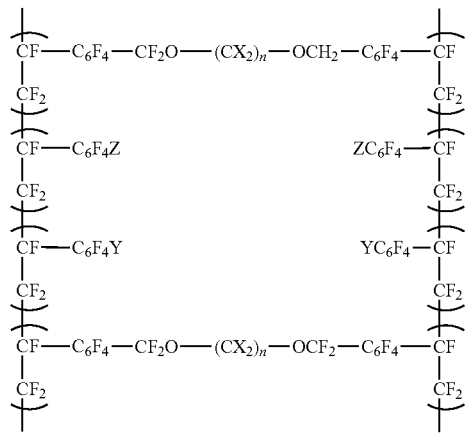

wherein X=F and n=6-14 or X=H and n=6-18, Y=$SO_3H^+$ or $R_f$—$SO_3H^+$, with $R_f$=—$(CF_2)_m$—O—$CF_2CF_2$— and m=2-7, and Z=OH or $NH_2$.

6. The method of claim 1, wherein the styrene-based comonomer is a styrene sulfonic acid comonomer having the formula $CH_2\!=\!CH\!-\!C_6H_4\!-\!SO_3H^+$ and the crosslinked polymer produced has Structure A, wherein X=F and n=6-14 or X=H and n=6-18, Y=$SO_3H^+$ and Z=OH or $NH_2$ as the free-radical scavenger.

7. The method of claim 1, wherein the styrene-based comonomer is a styrene sulfonate-sodium comonomer having the formula $CH_2\!=\!CH\!-\!C_6H_4\!-\!SO_3Na^+$, with polymerizing resulting in intermediate structure B:

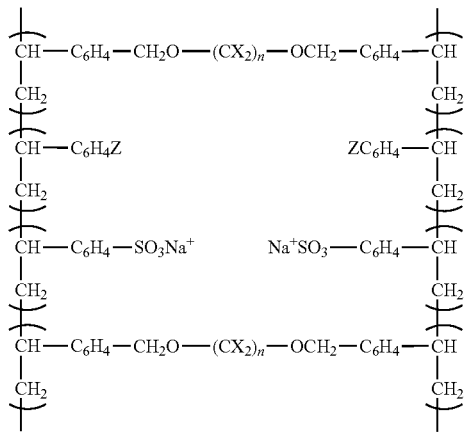

the method further comprising:
performing ion exchange with an acid solution and the intermediate structure B to produce the crosslinked polymer with Structure A wherein X=F and n=6-14 or X=H and n=6-18, Y=$SO_3H^+$ and Z=OH or $NH_2$ as the free-radical scavenger.

8. The method of claim 1, wherein the styrene-based comonomer is a styrene sulfonyl halide comonomer having one of the formulas $CH_2\!=\!CH\!-\!C_6H_4\!-\!SO_2Cl$ and $CH_2\!=\!CH\!-\!C_6H_4\!-\!SO_2F$, with polymerizing resulting in intermediate structure C:

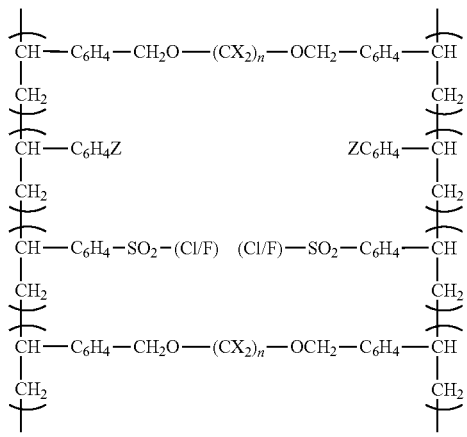

the method further comprising:
hydrolyzing the intermediate Structure C with a basic solution; and
performing ion exchange with an acid solution to produce the crosslinked polymer with Structure A, wherein X=F and n=6-14 or X=H and n=6-18, Y=$SO_3H^+$ and Z=OH or $NH_2$ as the free-radical scavenger.

9. The method of claim 1, wherein the styrene-based comonomer is 4-bromo styrene comonomer having the formula $CH_2\!=\!CH\!-\!C_6H_4\!-\!Br$, with polymerizing resulting in intermediate structure D:

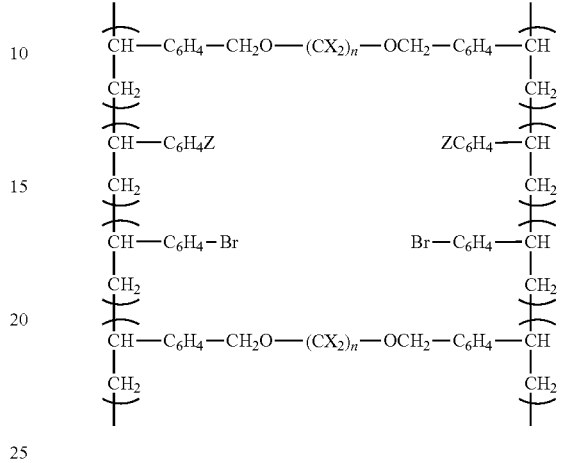

the method further comprising:
reacting the intermediate Structure D with $I\!-\!(CF_2)_m\!-\!O\!-\!CF_2\!-\!CF_2\!-\!SO_2F$, where m=2-7, under heat and in the presence of copper or copper oxide catalyst to produce a second intermediate Structure E:

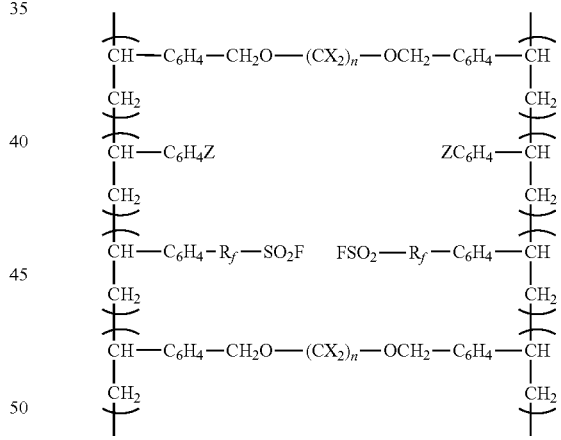

the method further comprising:
hydrolyzing the second intermediate Structure E with a basic solution; and
performing ion exchange with an acid solution to produce the crosslinked polymer with Structure A, wherein X=F and n=6-14 or X=H and n=6-18, Y=$R_f\!-\!SO_3H^+$, with $R_f\!=\!-(CF_2)_m\!-\!O\!-\!CF_2CF_2\!-$ and m=2-7, and Z=$NH_2$ as the free-radical scavenger.

10. The method of claim 1, wherein the styrene-based comonomer is 4-hydroxy styrene comonomer having the formula $CH_2\!=\!CH\!-\!C_6H_4\!-\!OH$, with polymerizing resulting in intermediate structure F:

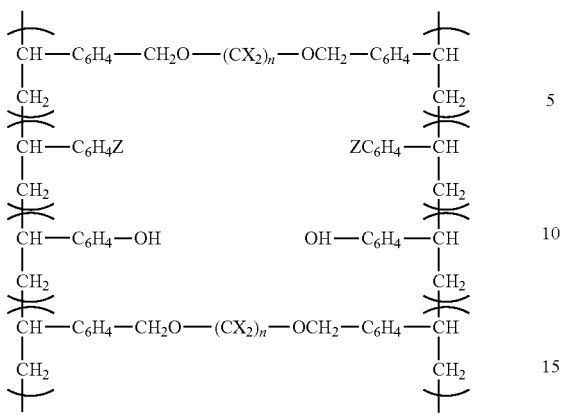

the method further comprising:
reacting the intermediate Structure F with I—$(CF_2)_m$—O—$CF_2$—$CF_2$—$SO_2F$, where m=2-7, under heat and in the presence of copper or copper oxide catalyst to produce a second intermediate Structure G:

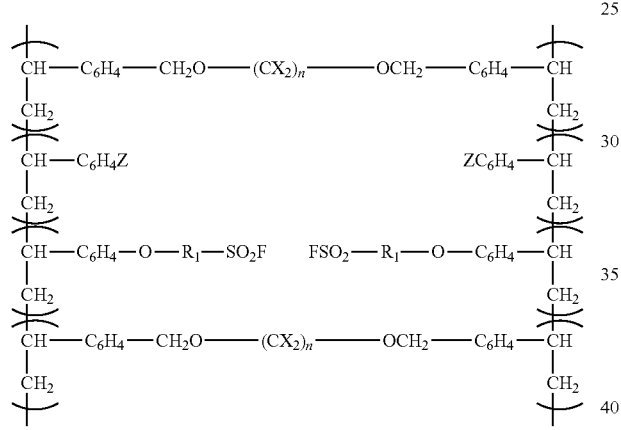

the method further comprising:
hydrolyzing the second intermediate Structure G with a basic solution; and
performing ion exchange with an acid solution to produce the crosslinked polymer with Structure A, wherein X=F and n=6-14 or X=H and n=6-18, Y=$R_f$—$SO_3H^+$, with $R_f$=—$(CF_2)_m$—O—$CF_2CF_2$— and m=2-7, and Z=$NH_2$ as the free-radical scavenger.

11. The method of claim 1, wherein the styrenated crosslinkable monomer has the formula $CH_2$=CH—$C_6H_4$—$CH_2$—O—$(CF_2)_n$—O—$CH_2$—$C_6H_4$—CH=$CH_2$, n=6-14, the method further comprising, as initial steps:
producing the styrenated crosslinkable monomer by functionalizing a linear chain diol with styrene, the linear chain diol having the formula OH—$CH_2$—$(CF_2)_n$—$CH_2$—OH, wherein n=6-14.

12. The method of claim 1, wherein the styrenated crosslinkable monomer has the formula $CH_2$=CH—$C_6H_4$—$CH_2$—O—$(CH_2)_n$—O—$CH_2$—$C_6H_4$—CH=$CH_2$, n=6-18, the method further comprising, as initial steps:
producing the styrenated crosslinkable monomer by functionalizing a linear chain diol with styrene, the linear chain diol having the formula OH—$CH_2$—$(CH_2)_n$—$CH_2$—OH, wherein n=6-18.

13. A method of preparing a crosslinked polymer having increased chemical durability, the method comprising:
polymerizing, using an initiator with light irradiation or heat treatment, a styrenated crosslinkable monomer with a styrene-based comonomer having the formula $CH_2$=CH—$C_6H_4$—X and a free-radical scavenger, wherein the styrenated crosslinkable monomer has the following linear chain formula $CH_2$=CH—$C_6H_4$—$CH_2$—$(OCH_2CH_2)_n$—O—$CH_2$—$C_6H_4$—CH=$CH_2$, wherein n is obtained by a molecular weight of the styrenated crosslinkable monomer, which is a styrenated polyethylene glycol having a molecular weight between 200 and 35,000 g/mol or a styrenated polyethylene oxide having a molecular weight between 100,000 and 800,000 g/mol, and the crosslinked polymer has the following Structure M, wherein X=$SO_3H^+$ or $R_f$—$SO_3H^+$, with $R_f$=—$(CF_2)_m$—O—$CF_2CF_2$— and m=2-7, and Z=OH or $NH_2$:

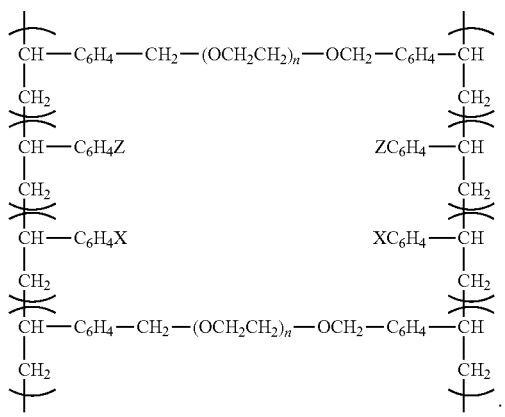

14. The method of claim 13, wherein the styrene-based comonomer is a styrene sulfonic acid comonomer having the formula $CH_2$=CH—$C_6H_4$—$SO_3H^+$ and the crosslinked polymer produced has Structure M, wherein X=$SO_3H^+$ and Z=OH or $NH_2$ as the free-radical scavenger.

15. The method of claim 13, wherein the styrene-based comonomer is a styrene sulfonate-sodium comonomer having the formula $CH_2$=CH—$C_6H_4$—$SO_3Na^+$, with polymerizing resulting in intermediate structure N:

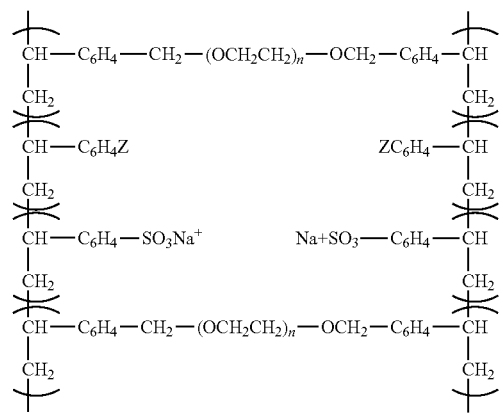

the method further comprising:
performing ion exchange with an acid solution and the intermediate structure N to produce the crosslinked polymer with Structure M wherein $X=SO_3H^+$ and $Z=OH$ or $NH_2$ as the free-radical scavenger.

16. The method of claim 13, wherein the styrene-based comonomer is a styrene sulfonyl halide comonomer having one of the formulas $CH_2=CH-C_6H_4-SO_2Cl$ and $CH_2=CH-C_6H_4-SO_2F$, with polymerizing resulting in intermediate structure O:

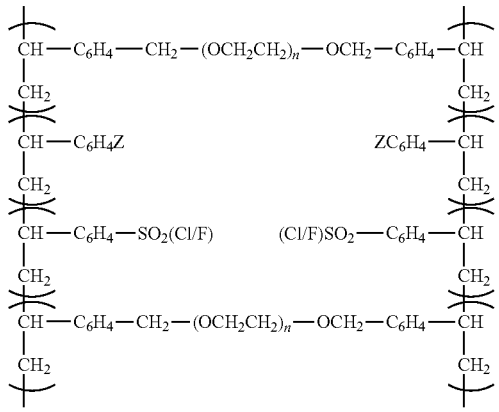

the method further comprising:
hydrolyzing the intermediate structure O with a basic solution; and
performing ion exchange with an acid solution to produce the crosslinked polymer with Structure M, wherein $X=SO_3H^+$ and $Z=OH$ or $NH_2$ as the free-radical scavenger.

17. The method of claim 13, wherein the styrene-based comonomer is 4-bromo styrene comonomer having the formula $CH_2=CH-C_6H_4-Br$, with polymerizing resulting in intermediate structure P:

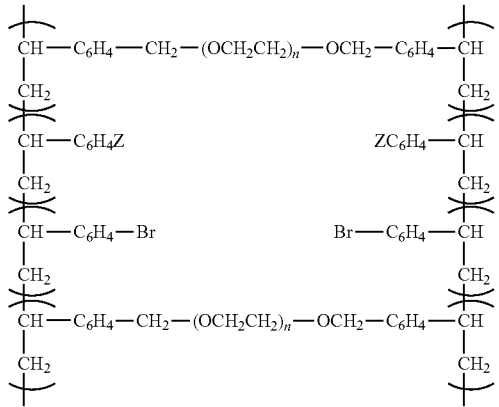

the method further comprising:
reacting the intermediate Structure P with $I-(CF_2)_m-O-CF_2-CF_2-SO_2F$, where m=2-7, under heat and in the presence of copper or copper oxide catalyst to produce a second intermediate Structure Q:

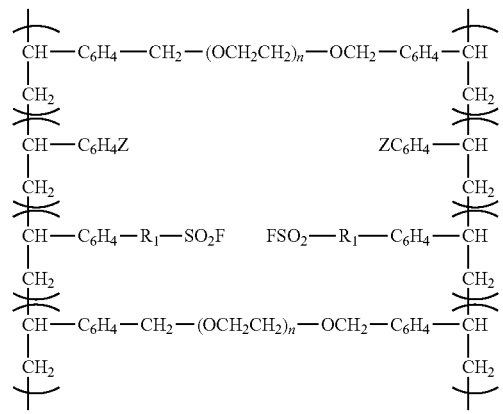

the method further comprising:
hydrolyzing the second intermediate Structure Q with a basic solution; and
performing ion exchange with an acid solution to produce the crosslinked polymer with Structure M, wherein $X=R_f-SO_3H^+$, with $R_f=(CF_2)_m-O-CF_2CF_2-$ and m=2-7, and $Z=NH_2$ as the free-radical scavenger.

18. The method of claim 13, wherein the styrene-based comonomer is 4-hydroxy styrene comonomer having the formula $CH_2=CH-C_6H_4-OH$, with polymerizing resulting in intermediate structure R:

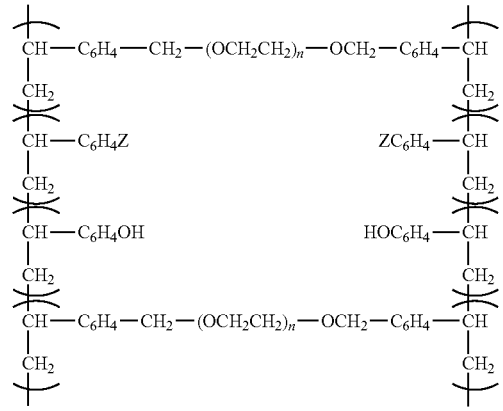

the method further comprising:
reacting the intermediate Structure R with $I-(CF_2)_m-O-CF_2-CF_2-SO_2F$, where m=2-7, under heat and in the presence of copper or copper oxide catalyst to produce a second intermediate Structure S:

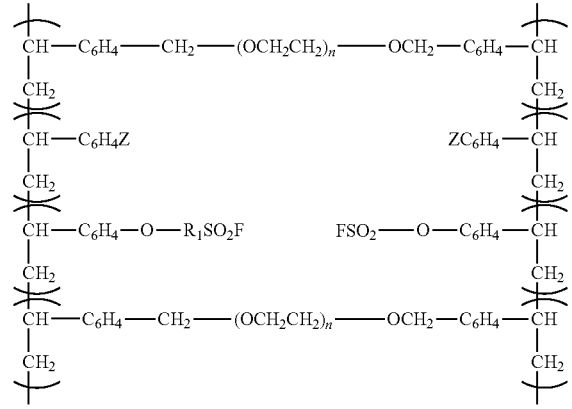

the method further comprising:
- hydrolyzing the second intermediate Structure S with a basic solution; and
- performing ion exchange with an acid solution to produce the crosslinked polymer with Structure M, wherein $X=R_f-SO_3H^+$, with $R_f=(CF_2)_m-O-CF_2CF_2-$ and m=2-7, and $Z=NH_2$ as the free-radical scavenger.

19. A method of making a polymer electrolyte membrane comprising:
- imbibing a porous support with the crosslinked polymer of according to claim 1.

* * * * *